United States Patent
Midwinter et al.

(10) Patent No.: US 6,668,288 B1
(45) Date of Patent: Dec. 23, 2003

(54) TELECOMMUNICATIONS DATA CONFERENCING PLATFORM HAVING SECURE FIREWALL WHEREIN ACCESS IS RESTRICTED TO MESSAGES ORIGINATING FROM SERVER BUT CONFERENCE DATA PASS FREELY

(75) Inventors: Timothy Midwinter, Suffolk (GB); Ian Geoffrey Daniels, Suffolk (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/600,305

(22) PCT Filed: Feb. 8, 1999

(86) PCT No.: PCT/GB99/00394

§ 371 (c)(1),
(2), (4) Date: Jul. 14, 2000

(87) PCT Pub. No.: WO99/41896

PCT Pub. Date: Aug. 19, 1999

(30) Foreign Application Priority Data

Feb. 13, 1998 (EP) .............................. 98301070
Feb. 13, 1998 (GB) .............................. 9803139

(51) Int. Cl.[7] .......................... G06F 3/00; G06F 13/00
(52) U.S. Cl. ............................... 710/29; 710/1; 710/33; 710/34; 709/204; 709/208; 712/31; 713/200; 713/201
(58) Field of Search ................................. 710/1, 29, 34, 710/33; 712/31; 713/200, 201; 709/204, 208

(56) References Cited

U.S. PATENT DOCUMENTS

| | | | | |
|---|---|---|---|---|
| 5,036,518 A | * | 7/1991 | Tseung ........................ | 714/748 |
| 5,195,086 A | * | 3/1993 | Baumgartner et al. ...... | 370/264 |
| 5,852,466 A | * | 12/1998 | Komine et al. ............ | 348/14.1 |
| 5,943,321 A | * | 8/1999 | St-Hilaire et al. .......... | 370/259 |
| 6,199,101 B1 | * | 3/2001 | Pfaff .......................... | 709/204 |

* cited by examiner

Primary Examiner—Jeffrey Gaffin
Assistant Examiner—Tammara Peyton
(74) Attorney, Agent, or Firm—Nixon & Vanderhye PC

(57) ABSTRACT

A telecommunications data conferencing platform has a secure zone and a partly secure zone connected by a secure firewall. The secure zone contains a master data server, a billing system a reservation system and an audio bridge connected to the firewall. The partly secure zone contains a pair of slave data servers. The first slave data server can be connected through a public firewall to the public Internet. The first slave data server can receive incoming calls from the public switched telecommunications network via a bank of modems. The secure firewall restricts the passage of messages from the partly secure zone to the secure zone to messages which originate directly in the partly secure zone but allows the passage of conference data. Thus, unauthorised parties are unable to gain access to the reservation system or the master data server. In order to establish a conference, the reservation system creates a conference on the master data server. The master data server then invites the slave data server to join the conference. The slave data servers then permit participants to join the conference.

17 Claims, 3 Drawing Sheets

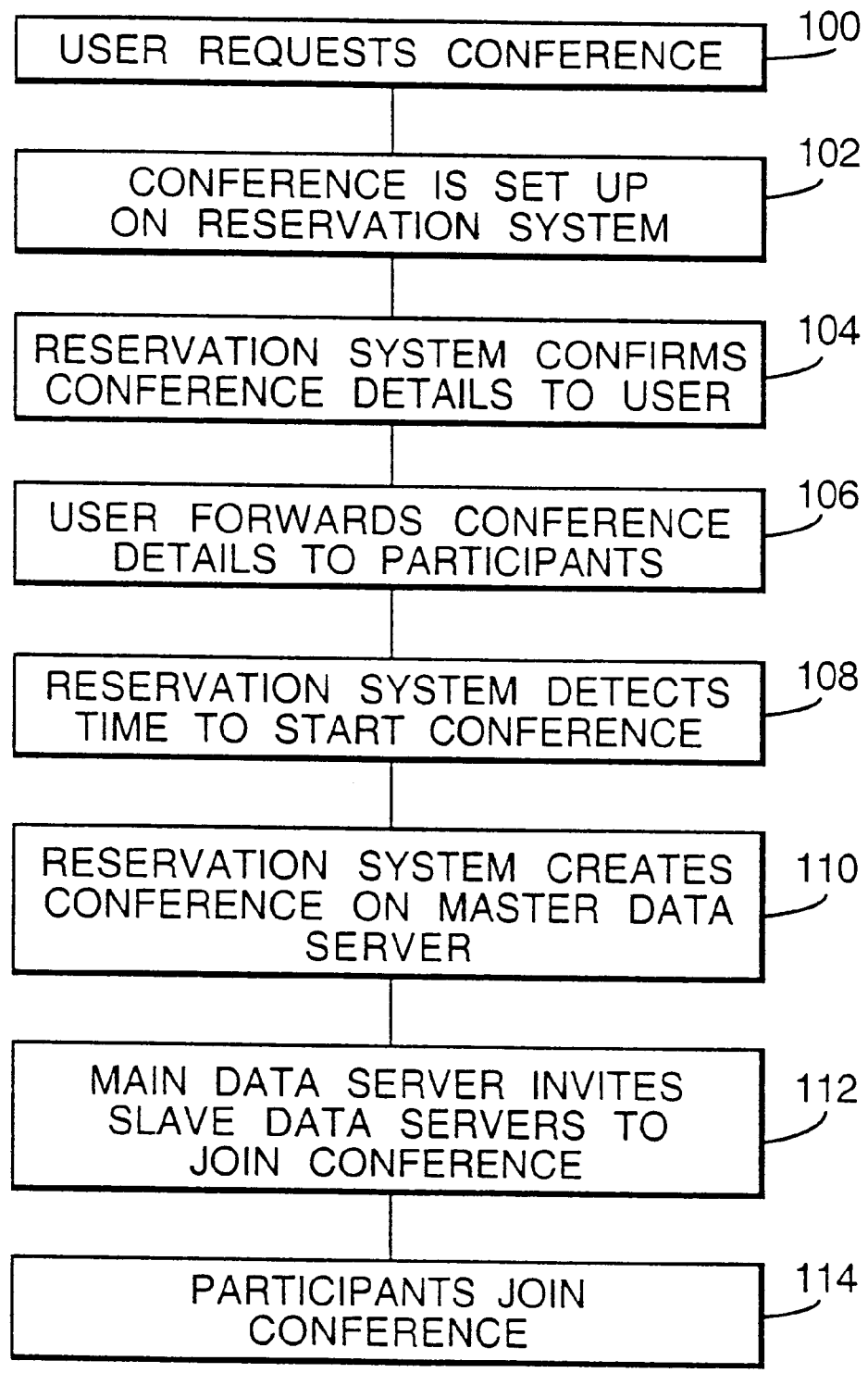

TELECOMMUNICATIONS DATA CONFERENCING PLATFORM HAVING SECURE FIREWALL WHEREIN ACCESS IS RESTRICTED TO MESSAGES ORIGINATING FROM SERVER BUT CONFERENCE DATA PASS FREELY

FIELD AND BACKGROUND OF THE INVENTION

This invention relates to a telecommunications data conferencing platform.

Telecommunications data conferencing platforms are already known. One example of a known data conferencing platform is the Databeam Net.120 System supplied by Databeam Corporation of Lexington, Ky., USA. A data conferencing platform typically comprises a reservation system and a data server. When an organiser wishes to establish a data conference, the organiser contacts the reservation system to reserve a time and date for the conference. The reservation system then confirms the details of the conference to the organiser. These details typically include an identifier for the conference and a password. The organiser then forwards these details to the participants to the conference. While the conference is in progress, the data conferencing platform transmits conference data, such as drawings and text, between terminals used by the participants. Thus, the participants share data during the conference.

Unfortunately, with the presently known data conferencing platforms, it is sometimes possible for an unauthorised third party to gain access to the reservation system and thus obtain details of a conference. Using these details, the unauthorised third party can sometimes gain access to data transmitted during the conference.

SUMMARY OF THE INVENTION

According to this invention, there is provided a data conferencing platform for providing a data conference between participants, said data conferencing platform having first and second zones, said data conferencing platform comprising:

a reservation system located in the first zone;

a data server located in the second zone and arranged to be connected to a communications network; and an interface between the first and second zones, the reservation system being connected through the interface to the data server;

the reservation system being arranged to make conference reservations;

the data server being arranged to receive details of a data conference from the reservation system and to pass conference data between communications terminals used by participants to a data conference;

the interface between the first and second zones being arranged to restrict the passage of messages from the second zone to the first zone to messages which originate directly in the second zone but allow the passage of conference data.

The expression "messages which originate directly in the second zone" is intended to cover messages which are created inside the second zone but to exclude messages which arise outside the second zone and pass through it to the interface. A first message might, for example, be created outside the second zone and be transmitted thereinto. The interface would not permit the passage of the first message from the second zone to the first zone. Were a server to take, for example, some or all of the information content of the first message however and create a second message, the interface would permit the passage of the second message from the second zone to the first zone. It will be appreciated that the messaging protocol associated with the first and second messages of this example may be different.

The messaging protocol associated with the first and second message might however be the same if mere authentication of the first message took place. The second message (an authenticated version of the first message) would originate directly in the second zone and could thus pass to the first zone.

BRIEF DESCRIPTION OF THE DRAWINGS

This invention will now be described in more detail, by way of example, with reference to drawings in which:

FIG. 3 is a flow chart of the operations which are performed in establishing a data conference using the platform shown in FIG. 1.

DETAILED DESCRIPTION OF THE INVENTION

Figure 1:
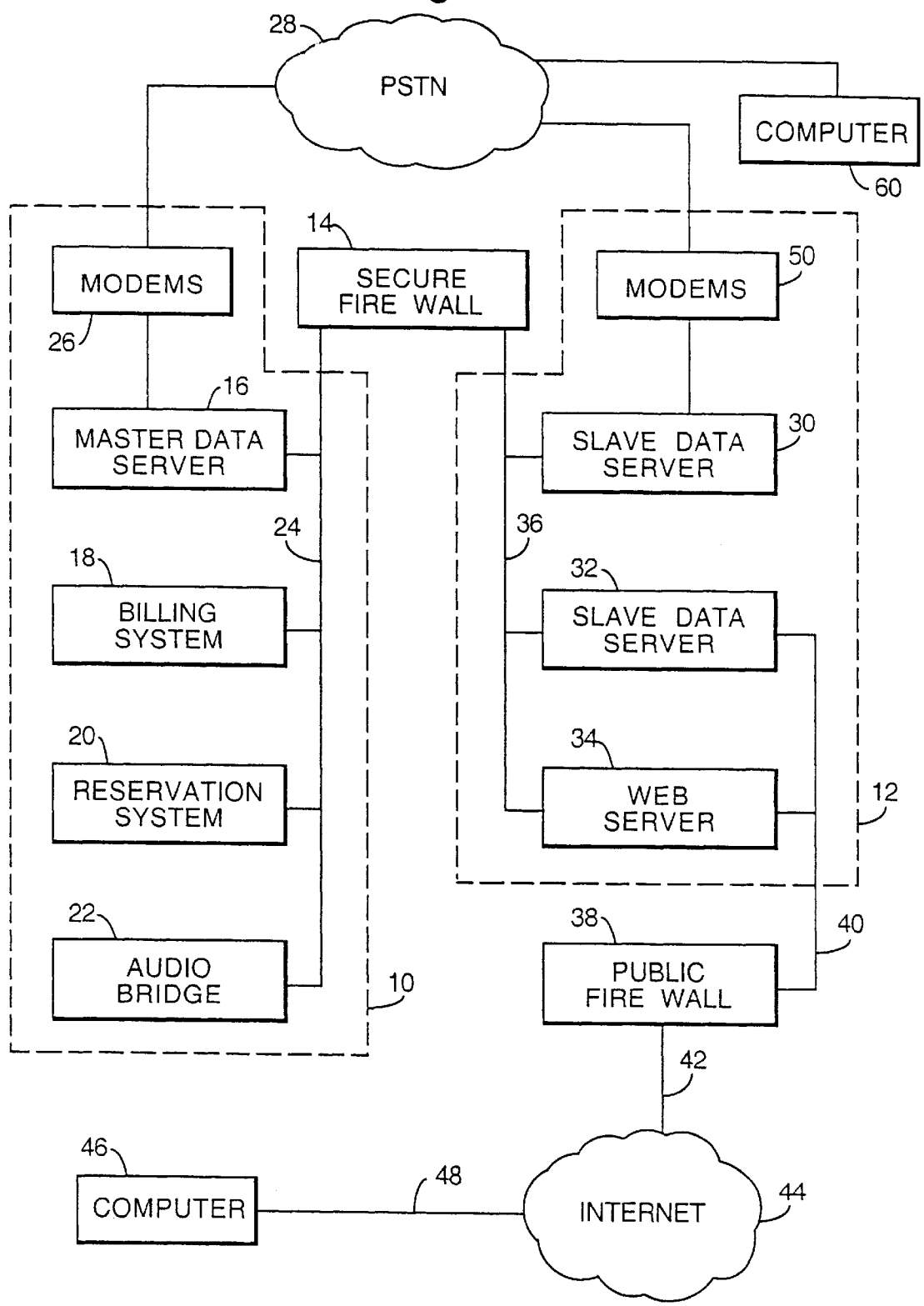
FIGS. 1 and 2 together illustrate the construction of a telecommunications data conferencing platform embodying this invention and the connections between the platform and terminals used by conference participants.

Referring now to FIG. 1, there is shown a telecommunications data conferencing platform which has a first secure zone 10, a second partly secure zone 12 and an interface in the form of a secure firewall 14 between the first and second zones 10, 12.

The first zone contains a master data server 16, a billing system 18, a reservation system 20 and an audio bridge 22, which are connected by a communications link 24 to the secure firewall 14. The reservation system 20 is responsible for making conference reservations and the master data server 16 holds conference data while a conference is in progress. The operation of the master data server 16 and the reservation system 20 will be described further below. The billing system 18 is responsible for generating the billing data for each conference. The audio bridge 22 is a bridge between the data conferencing platform and an audio conferencing platform and enables an audio conference to be set out in parallel with a data conference. The provision of an audio conference in parallel with a data conference does not form part of this invention as such and the audio bridge 22 will not be described in further detail.

Data conferencing platforms having a data server, a billing system and a reservation system are known. An example of such a system is the Databeam Net.120 System supplied by Databeam Corporation of Lexington, Ky., USA. The software which provides the functionality of the master data server 16, the billing system 18 and the reservation system 20 generally takes the form used in a known data conferencing platform but modified to provide the functionality described below.

The master data server 16 is connected through a bank of modems 26 to the public switched telecommunications network (PSTN) 28. The modems 26 permit the master data server 16 to make outgoing calls through the PSTN 28 but prevent the master data server 16 from receiving in-coming calls. As is well known, the PSTN is a circuit switched network.

The second zone 12 contains slave data servers 30 and 32 and a World Wide Web (Web) server 34 which are connected together and also to the secure firewall 14 through a communications link 36. The slave data server 32 and the Web server 34 are connected to a public firewall 38 by a communications link 40. The public firewall 38 is connected by a communications link 42 to the public Internet 44. A terminal in the form of a computer 46 is shown connected by a communications link 48 to the public Internet 44.

As will be described below, the users of computers which can be connected to the public Internet 44 can be participants in a data conference established by the data conferencing platform shown in FIG. 1. Thus, the user of computer 46 could be such a participant.

The slave data server 30 is connected through a bank of modems 50 to the PSTN 28. The modems 50 permit the slave data server 30 to receive incoming calls from the PSTN 28. Hence, the user of a computer connected to the PSTN 28, for example computer 60, can be a participant in a data conference established by the data conferencing platform shown in FIG. 1.

Figure 2:
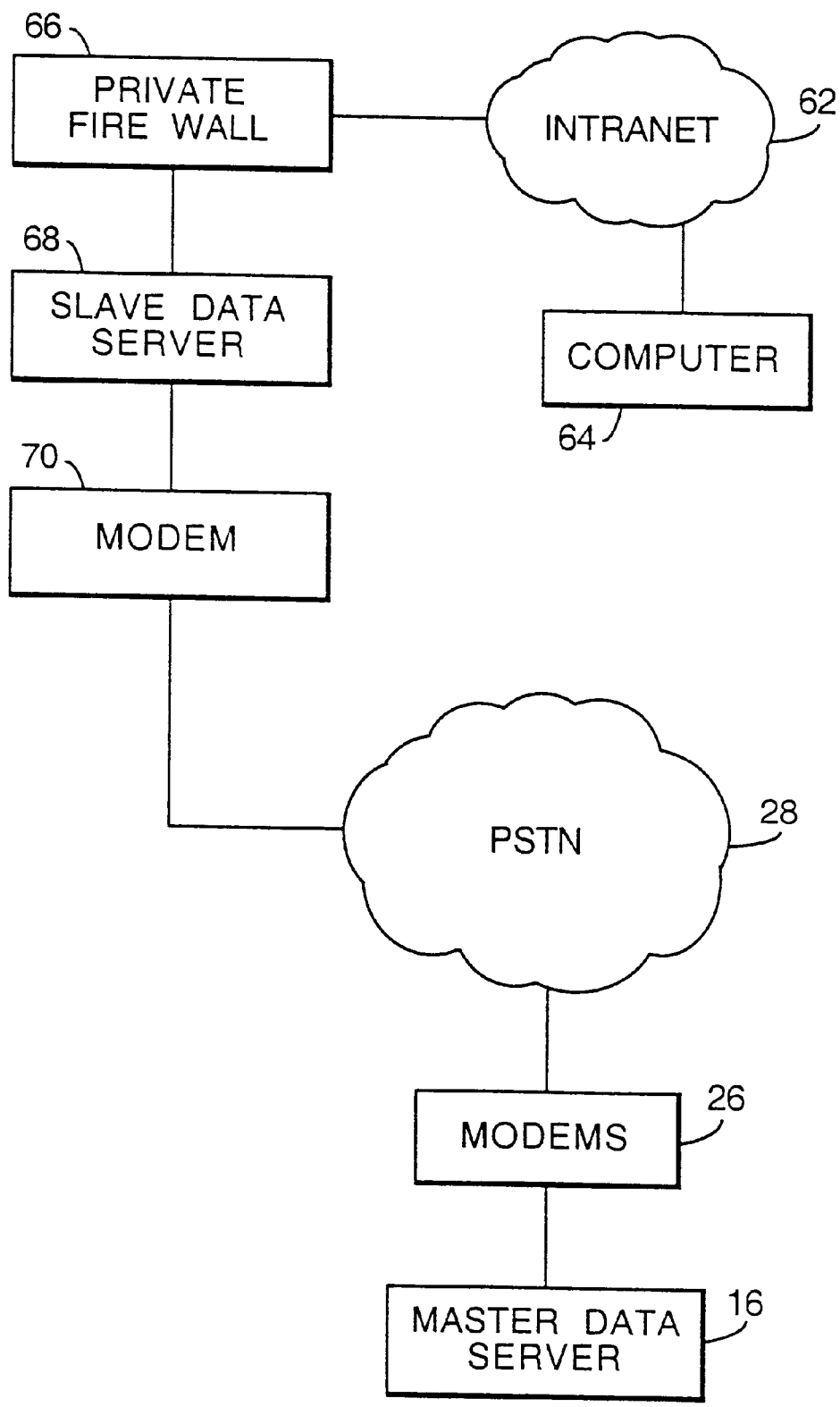

The users of terminals in the form of computers connected to a private intranet can be participants in a data conference established by the data conferencing platform shown in FIG. 1. FIG. 2 shows the connections and equipment which are used to connect such computers to the data conferencing platform of FIG. 1. For convenience, FIG. 2 also shows PSTN 28, modems 26 and the master data server 16.

Referring now to FIG. 2, there is shown a private intranet 62 and a computer 64 connected to it. The intranet 62 is connected through a private firewall 66 to a slave data server 68. The slave data server 68 is connected through a modem 70 to the PSTN 28. The modem 70 permits the slave data server 68 to receive incoming calls from the PSTN 28 but only for the purpose of connecting it to the master data server 16. Thus, the user of computer 64, or the user of any other computer connected to the private intranet 62, could be a participant in a data conference established by the data conferencing platform shown in FIG. 1. The users of computers connected to other private intranets can be participants in a data conference in a similar manner.

The data conferencing platform shown in FIG. 1 uses the T.120 data conferencing protocol established by the International Telecommunications Union.

The secure firewall 14 is arranged to restrict the passage of messages from the partly secure zone 12 to the secure zone 10 to messages which directly originate in the partly secure zone 12. Thus, the secure firewall 12 will permit the passage of a message created on the slave data server 30 or 32 or on the Web server 34. However, it will block a message which originates outside the partly secure zone 12 and which passes through the partly secure zone 12 simply by a routing function. The firewall 14 permits the passage of conference data which conforms to the T.120 data conferencing protocol (from the partly secure zone 14 to the secure zone 10).

The public firewall 38 is arranged to block the passage of messages which fall into one or more categories established by the owner of the data conferencing platform. The private firewall 66 is arranged to block all messages except for those which relate to a data conference.

The master data server 16, the billing system 18, the reservation system 20, the secure firewall 14, the slave data server 30, the slave data server 32, the Web server 34, the public firewall 42, the slave data server 68 and the private firewall 66 each take the form of an individual computer having software to provide the required functionality. However, by way of modification, in either the secure zone 10 or the partly secure zone 12, two or more of the components may share a common computer. For example, the billing system 18 and the reservation system 20 could be provided on a single computer.

In the present example, traffic on the communications links 24, 36, 42 and 48 is transmitted using the TCP/IP protocols. These protocols are also used for traffic between the slave data server 68 and the private intranet 62 as well as traffic between the private intranet 62 and computers connected to it.

As is well known, in addition to using the TCP/IP protocols, information transfer between clients and servers which use these protocols can also use higher level protocols. In the World Wide Web (or simply Web) service, information is stored as HyperText Markup Language (HTML) pages and information is transferred using the HyperText Transfer Protocol (HTTP). An Internet server which can supply information using the Web service is known as a Web server and the server 34 shown in FIG. 1 is an example of such a server. As will be explained below, a user having a computer which is capable of using the Web service can transmit a request for a data conference to the Web server 34. The Web server 34 then inserts the request into a message established in a format used by the reservation system 20 and forwards the message to the reservation system 20.

As evident from the description set out above, three types of participant can join a data conference established by the data conferencing platform of FIG. 1. The first category comprises users of computers which can connect to the public Internet, such as computer 46. The second category comprises users of computers, such as the user of computer 60, which can be connected through the PSTN 28 and modem 50 to the slave data server 30. In the third category there are users of computers connected to a private intranet which can be connected to the master data server 16 through a slave data server and modem provided for the private intranet. The user of computer 64 is an example of a participant in the third category.

There will now be described with reference to FIG. 3 the series of steps which are performed in establishing a data conference which has a participant from each category. In the example which will be described, the participants are the users of computers 46, 60 and 64.

Initially in a step 100, the organiser of the data conference sends a request to the reservation system 20 for a data conference. The request includes the date and time at which the conference is to begin and its duration. There are two possibilities for sending this request to the reservation system 20. The organiser can make a phone call to the operator of the reservation system 20, who then enters the details of the request into the reservation system 20. Alternatively, if the user has a computer provided with a Web browser which is connected to the public Internet, the user can send the request to the reservation system 20 via the Web server 34. In order to do this, the organiser's computer sends a request to the Web server 34 for a Web page containing a blank request form for a data conference. The Web server 34 then transmits the blank form to the organiser's computer. The organiser then enters the details of the request onto the Web page and the computer sends the Web page back to the Web server 34. The Web server 34 inserts the details of the request into a message which is in a format used by the reservation system 20 and forwards the message to the reservation system 20. Thus, the Web server 34 functions as a request handling server.

Next, in a step 102, the reservation system 20 checks if it will be able to establish a conference in accordance with the request. If it is possible to establish the conference, the reservation system 20 creates an identifier and a password for the conference and enters the details of the conference on its booking list.

Then, in a step 104, the reservation system 20 sends a confirmation message to the organiser. The confirmation message contains the identifier and the password for the conference. The reservation message can be sent to the organiser over the telephone by the operator of reservation system 20. Alternatively, if the organiser has a computer connected to the public Internet, the reservation message can be sent as an e-mail to the organiser's computer via the secure firewall 14, the server 34 and the public Internet 44.

In a step 106, the organiser forwards details of the conference to the three participants. Where a participant has a computer connected to the public Internet, the organiser can send the conference details to the participant simply by forwarding the e-mail received from the reservation system 20.

There is then a pause until, in a step 108, the reservation system 20 detects that it is time to start the conference.

When it is time to start the conference, in a step 110, the reservation system 20 creates the conference on the master data server 16. In order to do this, it transmits the details of the conference, including the password and the identifier for the conference, the start time and the duration, to the master data server 16.

Next, in a step 112, the master data server 16 invites the slave data servers 30, 32 and 68 to join the conference. In order to do this, it sends the details of the conference to each of these data servers. More specifically it sends the details of the conference to the slave data servers 30 and 32 via the communications link 24, firewall 14 and the communications link 36. In order to send the details of the conference to the slave data server 68, the master data server makes an outgoing call using one of the modems 26 through the PSTN 28 and modem 70 to the slave data server 68.

In this example, each of the slave data servers 30, 32 and 68 is invited to join the conference because each of these data servers will be used by one of the participants. More generally, the master data server invites each, but only each, slave data server which will be used by one or more participants to join the conference. Thus, if none of the users of the intranet 62 was a participant in the conference, the slave data server 68 would not be invited to join the conference. However, if the user of a computer connected to another private intranet was a participant in a conference, the slave data server associated with that private intranet would be invited to join the conference.

In a step 114, the participants join the conference. In order to do this, each participant sends a request message to join the conference to the appropriate slave data server. The request message includes the identifier and the password for the conference. More specifically, the user of computer 46 sends a request message to the slave data server 32 via the public Internet 44 and public firewall 38. The user of computer 60 makes an outgoing call through the PSTN 28 to modem 50, which then completes the connection to the slave data server 30. It is to be noted that the request messages from computers 46 and 60 are prevented from reaching the secure zone 10 by the secure firewall 10. The user of computer 64 sends a request through the private intranet 62 and private firewall 66 to the slave data server 68.

During the conference, each participant is able to add data to the conference. The manner in which each user adds items of data to the conference and these items of data are forwarded to the other participants will now be described.

If the user of computer 46 wishes to add an item of data to the conference, the item of data is transmitted by the computer 46 through the public Internet 44 to the slave data server 32. Slave data server 32 then forwards this item of information to any other computers connected to it and used by participants in the conference. In the present example, there are no such computers. The slave data server 32 also forwards the item of data (conforming to the T.120 data conferencing protocol) to the master data server 16. As stated above, the secure firewall 14 permits passage of such conference data. The master data server 16 forwards the item of information to the slave data servers 30, 68. The slave data server 68 forwards it to the computer 64 and the slave data server 60 forwards it to the computer 60. More generally, in a data conference, a slave data server forwards an item of information to any computer connected to it and used by a participant in the conference.

If the user of computer 60 wishes to add an item of information to the conference, the computer 60 transmits the item of information through the PSTN 28 to the slave data server 30. This item of information is then transmitted by salve data server 30 to any computer connected to it and used by a conference participant. In the present example, there are no such computers. The item of information is also forwarded by the slave data server 30 to the master data server 16. The master data server 16 forwards the item of information to the slave data servers 32 and 68. The slave data server 32 forwards it to the computer 46 and the slave data server 68 forwards it to the computer 64.

If the user of computer 64 wishes to add an item of information to the conference, it transmits the item of information to the slave data server 68. The slave data server 68 then forwards it to any other computer connected to the private intranet 62 and used by a participant to the conference. In this example, there are no such participants. The slave data server 68 also forwards the item of information to the master data server 16. The master data server 16 forwards the item of information to the slave data servers 30 and 32. Each of these slave data 30 and 32 also forwards the item of information to any computer connected to it and which is used by a participant to the conference. In the present example, the slave data servers 30 and 32 forward the item of information, respectively, to computers 60 and 46.

Because the reservation system 20 is located inside the secure zone 10, unauthorised persons cannot gain access to it, and so unauthorised persons are unable to obtain details of a conference established by the reservation system 20. In similar fashion unauthorised persons are likewise unable to gain direct access to the master data server 16. Thus, unauthorised persons are unable to obtain data used in a conference established by the data conferencing platform shown in FIG. 1. Furthermore, it will be appreciated that denial of direct access to the reservation system 20 or master data server 16 also precludes the possibility of using such access to interact with either the audio bridge 22 or the billing system 18.

There is a further level of security in data conferences which are established only by using connections through the PSTN 28. In such a conference the data does not pass through the public Internet 44. Consequently, an unauthorised third party is not able to access the conference data by using a technique for intercepting data passing through the public Internet.

As mentioned above, the data conferencing platform shown in FIG. 1 can be used to establish a data conference which uses all three categories of participants. However, if it is desired to provide a data conferencing platform for only one category of participants, then the design can be simplified. For example, if the data conferencing platform is required to provide data conferences only for participants who are connected to it through the public Internet, then the slave data server 30, the bank of modems 50 and the bank of modems 26 may be omitted. Further simplification can be made by omitting the master data server 16. With this further simplification, the reservation system 20 establishes the conference directly on the slave data server 32.

What is claimed is:

1. A data conferencing platform for providing a data conference between participants, said data conferencing platform having first and second zones, said data conferencing platform comprising:

a reservation system located in the first zone;

a data server located in the second zone and arranged to be connected to a communications network; and an interface between the first and second zones, the reservation system being connected through the interface to the data server;

the reservation system being arranged to make conference reservations;

the data server being arranged to receive details of a data conference from the reservation system and to pass conference data between communications terminals used by participants to a data conference;

the interface between the first and second zone being arranged to restrict the passage of messages from the second zone to the first zone to messages which originate directly in the second zone but allow the passage of conference data;

a master data server located in the first zone and connected to the reservation system and the interface between the first and second zones, the data server in the second zone being a slave data server, the master data server being arranged to receive details of a conference from the reservation system and to pass the details to the slave data server; and at least one other data server in the second zone, each data server in the second zone being a slave data server, the master data server being further arranged to pass conferencing data between the at least two slave data servers.

2. A data conferencing platform as claimed in claim 1, in which the master data server only passes the details of a conference received from the reservation system to a selected one or more of the at least two slave data servers.

3. A data conferencing platform as claimed in claim 1 further comprising a request handling server located in the second zone and connected to the interface between the first and second zones, the request handling server being arranged to receive first request messages for a data conference, to generate consequent second request messages for the data conference and to pass the second request messages to the reservation system.

4. A data conferencing platform as claimed in claim 3 in which the request handling server is arranged to generate the consequent second request messages using a different messaging protocol from that in which the first request messages were received.

5. A data conferencing platform as claimed in claim 1 in which at least one slave data server is arranged to be connected to a circuit switched communications network.

6. A data conferencing platform as claimed in claim 5 in which at least one slave data server is arranged to be connected to a circuit switched communications network.

7. A data conferencing platform for providing a data conference between participants, said data conferencing platform having first and second zones, said data conferencing platform comprising:

a reservation system located in the first zone;

a data server located in the second zone and arranged to be connected to a communications network; and an interface between the first and second zones, the reservation system being connected through the interface to the data server;

the reservation system being arranged to make conference reservations;

the data server being arranged to receive details of a data conference from the reservation system and to pass conference data between communications terminals used by participants to a data conference;

the interface between the first and second zone being arranged to restrict the passage of messages from the second zone to the first zone to messages which originate directly in the second zone but allow the passage of conference data;

a master data server located in the first zone connected to the reservation system and the interface between the first and second zones, the data server in the second zone being a slave data server, the master data server being arranged to receive details of a conference from the reservation system and to pass the details to the slave data server; and in which the master data server is arranged to make an outgoing call though a public circuit switched telecommunications network to a slave data server connected to a private packet switched telecommunications network, said master data server being arranged to refuse in-coming calls.

8. A conferencing hub operable to interconnect a plurality of participants in a data conference, said conferencing hub comprising:

a reservation system arranged in operation to store conference reservation data;

a data server;

an interface between said reservation system and said data server;

wherein, at the time of said data conference, said reservation system is arranged in operation to pass said conference reservation data through said interface to said data server and said data server is arranged in operation to pass conference data between said participants; and wherein, said interface is arranged in operation to restrict access to said reservation system to messages originating from said data server but to allow conference data to pass freely.

9. A conferencing hub as claimed in claim 8, further comprising:

a master data server connected to said reservation system and said interface;

wherein said data server comprises a slave data server; and wherein, at the time of said data conference, said master data server is arranged in operation to receive said conference reservation data and to pass said conference reservation data to said slave data server.

10. A conferencing hub as claimed in claim 9, further comprising:

at least one other slave data server; and wherein said master data server is further arranged in operation to pass conference data between said slave data servers.

11. A conferencing hub as claimed in claim 10, wherein said master data server is arranged in operation to only pass said conference reservation data to a selected one or more of said slave data servers.

12. A conferencing hub as claimed in claim 8 further comprising:

a request handling server connected to said interface; and wherein said request handling server is arranged in operation to receive a first request messages for said data conference from one of said participants, generate a consequent second request message for said data conference and pass said consequent second request message to said reservation system.

13. A conferencing hub as claimed in claim 12, wherein said request handling server is arranged in operation to generate said consequent second request messages using a different messaging protocol from that in which the first request message was received.

14. A conferencing hub as claimed in claim 9, wherein at least one slave data server is arranged in operation to be connected to a packed switched communications network.

15. A conferencing hub as claimed in claim 14, wherein at least one slave data server is arranged in operation to be connected to a circuit switched communications network.

16. A conferencing hub as claimed in claim 8, wherein said master data server is arranged in operation to make an outgoing call though a public circuit switched telecommunications network to a slave data server connected to a private packet switched telecommunications network, said master data server being arranged in operation to refuse in-coming calls.

17. A method of data conferencing, said method comprising the steps of:

sending a reservation for a data conference to a reservation system of a data conferencing hub;

storing conference reservation data relating to said reservation at said reservation system;

operating said reservation system, at the time of said data conference, to pass said conference reservation data through an interface to a data server;

operating said data server to pass conference data between participants in said data conference; and operating said interface to restrict access to said reservation system to messages originating from said data server but to allow conference data to pass freely.

* * * * *